United States Patent
Nagao

(10) Patent No.: US 11,061,484 B2
(45) Date of Patent: Jul. 13, 2021

(54) COMPUTING DEVICE AND PREDICTIVE CONVERSION METHOD

(71) Applicant: FUJITSU LIMITED, Kawasaki (JP)

(72) Inventor: Yuuki Nagao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/538,143

(22) Filed: Aug. 12, 2019

(65) Prior Publication Data
US 2020/0064930 A1  Feb. 27, 2020

(30) Foreign Application Priority Data
Aug. 23, 2018 (JP) .............................. JP2018-156017

(51) Int. Cl.
*G06F 3/023* (2006.01)
*G06F 40/242* (2020.01)
*G06F 40/274* (2020.01)

(52) U.S. Cl.
CPC .......... *G06F 3/0237* (2013.01); *G06F 3/0236* (2013.01); *G06F 40/242* (2020.01); *G06F 40/274* (2020.01)

(58) Field of Classification Search
None
See application file for complete search history.

(56) References Cited

U.S. PATENT DOCUMENTS

| | | | | |
|---|---|---|---|---|
| 7,647,312 B2 * | 1/2010 | Dai | ..................... | G06F 16/9535 707/999.004 |
| 8,601,019 B1 * | 12/2013 | Weininger | ........ | G06F 16/90324 707/769 |
| 8,745,018 B1 * | 6/2014 | Singleton | ................ | G06F 3/048 707/705 |
| 9,720,955 B1 * | 8/2017 | Cao | ....................... | G06F 3/0237 |
| 10,678,429 B1 * | 6/2020 | Tse | ......................... | G06F 16/951 |
| 10,698,931 B1 * | 6/2020 | Zelenov | ................ | G06F 16/951 |
| 2006/0259479 A1 * | 11/2006 | Dai | ..................... | G06F 16/9535 |
| 2011/0040908 A1 * | 2/2011 | Ikeda | ..................... | G06F 3/0237 710/67 |
| 2011/0202836 A1 * | 8/2011 | Badger | ................. | G06F 3/0237 715/702 |
| 2012/0220275 A1 * | 8/2012 | Wakasa | ............... | G06F 16/3322 455/414.1 |
| 2013/0038537 A1 * | 2/2013 | Nishii | .................. | G06F 40/274 345/168 |

(Continued)

FOREIGN PATENT DOCUMENTS

JP  2004-078664 A  3/2004
JP  2010-140163 A  6/2010

*Primary Examiner* — Howard Cortes
(74) *Attorney, Agent, or Firm* — Fujitsu Patent Center

(57) ABSTRACT

A computing device includes a memory and a processor configured to perform, in response to receiving character information input by character input assistant software, display of the character information and candidate character information indicating one or more character strings predicted based on the character information, and perform, in response to receiving selection of a first character string from the one or more character strings, transmission of the first character string in association with the character information to a destination according to the character input assistant software.

13 Claims, 13 Drawing Sheets

(56) References Cited

U.S. PATENT DOCUMENTS

| | | | |
|---|---|---|---|
| 2013/0117022 A1* | 5/2013 | Chen | H04M 1/72563 704/235 |
| 2014/0365448 A1* | 12/2014 | Keller | G06F 16/3322 707/692 |
| 2015/0019204 A1* | 1/2015 | Simard | G06F 3/0482 704/9 |
| 2015/0106701 A1* | 4/2015 | Honma | G06F 40/157 715/259 |
| 2016/0282956 A1* | 9/2016 | Ouyang | G06F 40/00 |
| 2018/0349474 A1* | 12/2018 | Smith | G06Q 10/063 |
| 2018/0349642 A1* | 12/2018 | Sehgal | G06F 16/242 |
| 2020/0042104 A1* | 2/2020 | Kozhaya | G06F 3/0237 |

* cited by examiner

FIG. 5

| ENTERED CHARACTER STRING | AUTOCOMPLETE RESULT |
|---|---|
| TOK | TOKYO |

COMPUTING DEVICE AND PREDICTIVE CONVERSION METHOD

CROSS-REFERENCE TO RELATED APPLICATION

This application is based upon and claims the benefit of priority of the prior Japanese Patent Application No. 2018-156017, filed on Aug. 23, 2018, the entire contents of which are incorporated herein by reference.

FIELD

The embodiment relates to a predictive conversion technique and a technique for assisting entry.

BACKGROUND

In recent years, with the spread of Hyper Text Markup Language (HTML) 5, web contents have provided advanced functions to viewers. One of the functions is, for example, an autocomplete function of presenting candidates for a search keyword during the entry of a text (character string) in an information search service using a search engine.

The autocomplete function presents, as one or more candidates (or entry candidates), one or more character strings predicted to be entered by a user during the time when the user enters a character string in a region for keyword entry. Then, the user may select a character string to be entered from among the presented one or more character strings serving as the one or more entry candidates during the character entry, thereby completing the entry without entering a remaining portion of the search keyword using a keyboard or the like. Thus, the user may reduce time and effort to be spent on the entry of a character string. A function of generating a character string serving as an entry candidate based on an entered character string is referred to as predictive conversion function in some cases.

FIG. 11 is a diagram describing an autocomplete function provided by a web content in a related-art computing device. FIG. 11 illustrates an entry screen 501 for enabling a keyword search. The entry screen 501 is a web content displayed on a display of the mobile computing device such as a smartphone or a tablet.

The entry screen 501 includes an entry field 502. A user uses an input device (not illustrated) such as a keyboard to enter a search keyword in the entry field 502, thereby performing a search. FIG. 11 illustrates a state in which the user is in the process of entering the search keyword and a character string "TOK" is entered in the entry field 502.

The web content generates one or more character strings (or entry candidates) predicted to be entered, based on an incomplete character string entered in the entry field 502, and displays the one or more character strings as a predicted search keyword list 503 under the entry field 502 so that the one or more character strings are arranged side by side. In an example illustrated in FIG. 11, character strings indicating "Tokyo", "Tokyo station" and "Tokyo dome" are displayed as entry candidates in the predicted search keyword list 503.

The user may select an entry candidate to be entered from among the multiple entry candidates displayed in the predicted search keyword list 503 during the entry of a character string in the entry field 502, thereby completing the entry of the character string in the entry field 502 without entering a remaining portion of the search keyword. In the aforementioned manner, the predictive conversion function enables a character entered by the user to be autocompleted.

For a normal language input system (for example, input method editor (IME)) of the computing device, an autocomplete function is known, which learns a result of conversion executed on a character entered by a user via the IME, executes predictive conversion on the character, and presents an entry candidate.

FIG. 12 is a diagram describing the autocomplete function provided by the IME in a related-art computing device. FIG. 12 illustrates an entry screen 600, displayed on a display of the mobile computing device, of the IME. The mobile computing device is a smartphone, a tablet, or the like.

The entry screen 600 includes a software keyboard 601 and an entry candidate display field 602.

The software keyboard 601 is an input section to be used by a user to enter a character. The user performs a touch operation or the like on the software keyboard 601 to enter a character. The character entered using the software keyboard 601 is displayed in the entry field 603.

In the entry candidate display field 602, a candidate character string (or an entry candidate) predicted to be entered by the user is displayed. The IME displays, in the entry candidate display field 602, candidate character strings (or entry candidates) predicted to be entered, based on a character entered using the software keyboard 601, so that the candidate character strings are arranged side by side.

An example illustrated in FIG. 12 indicates a state in which the user is in the process of entering characters using the software keyboard 601 and a character string "TOK" is entered in the entry field 603.

The IME generates one or more entry candidates based on the incomplete character string entered in the entry field 603 and displays the one or more entry candidates in the entry candidate display field 602 so that the one or more entry candidates are arranged side by side. In FIG. 12, character strings indicating "Tokyo", "Tokyo station", "Tokyo dome" and "Token" are displayed as entry candidates in the entry candidate display field 602.

The user may select an entry candidate to be entered from among multiple entry candidates displayed in the entry candidate display field 602 during the entry of a text, thereby completing the entry of a character string in the entry field 603 without entering a remaining portion of the character string to be entered.

The IME associates the entry candidate selected by the user with a character already entered upon the selection and registers the entry candidate and the character in a dictionary to update the dictionary, thereby improving the accuracy of conversion. In the computing device, autocomplete functions are provided from various applications.

For example, Japanese Laid-open Patent Publication No. 2004-78664 and Japanese Laid-open Patent Publication No. 2010-140163 have been disclosed.

SUMMARY

According to an aspect of the embodiments, a computing device includes a memory and a processor configured to perform, in response to receiving character information input by character input assistant software, display of the character information and candidate character information indicating one or more character strings predicted based on the character information, and perform, in response to receiving selection of a first character string from the one or more character strings, transmission of the first character string in association with the character information to a destination according to the character input assistant software.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram exemplifying autocomplete result information notified to the IME in the computing device according to the example of the embodiment;

DESCRIPTION OF EMBODIMENTS

In the related-art computing device, the IME may be used to enter a character in the entry field 502 of the web content.

Figure 13:
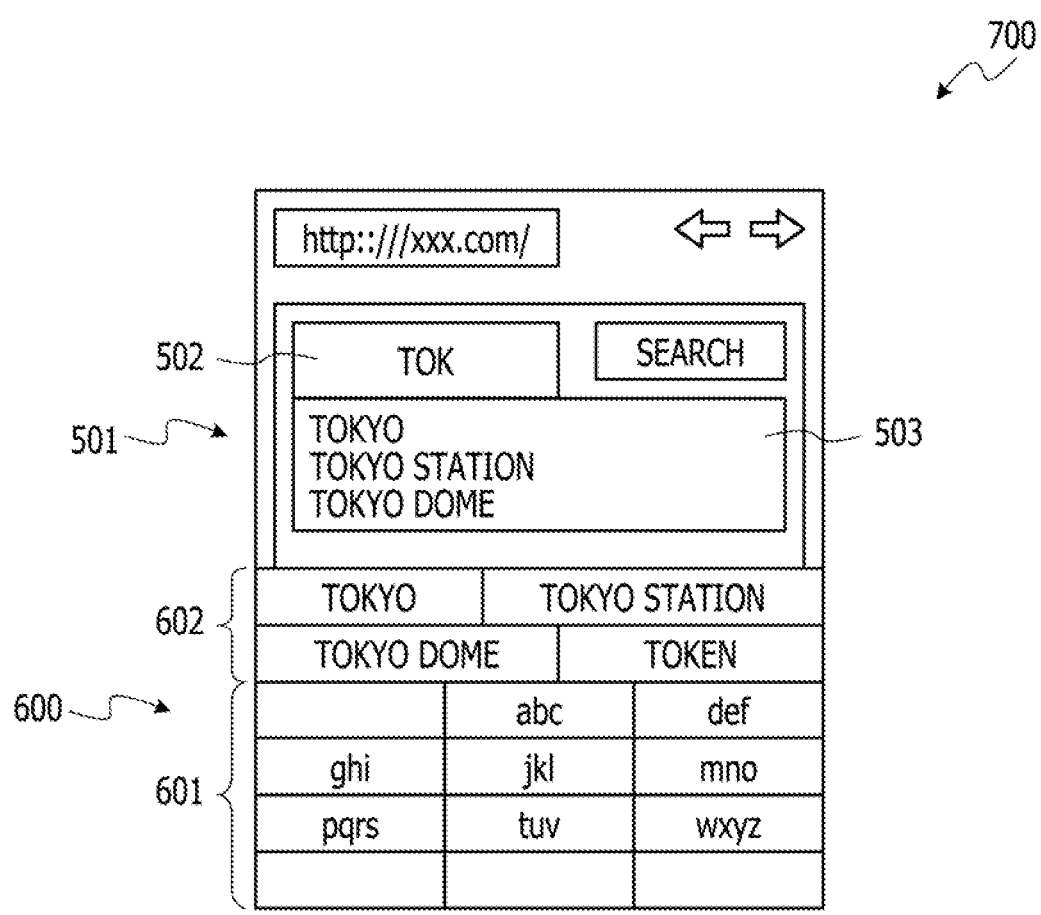
FIG. 13 is a diagram describing the use of both the autocomplete function provided by the web content and the autocomplete function provided by the IME in the related-art computing device.

FIG. 13 is a diagram describing the use of both the autocomplete function provided by the web content and the autocomplete function provided by the IME in the related-art computing device.

FIG. 13 illustrates an entry screen 700 that is a web page displayed on a display of the mobile computing device such as a smartphone or a tablet and includes the entry screen 501 and the entry screen 600. Since like numbers and references described above refer to like components in the drawings, any repetitive descriptions will be omitted.

A user uses the software keyboard 601 to enter a character string in the entry field 502 on the entry screen 700 illustrated in FIG. 13, thereby entering a search keyword in the entry field 502.

Based on the incomplete character string entered in the entry field 502, character strings, which are entry candidates generated by a predictive conversion function provided by the IME, are displayed in the entry candidate display field 602.

In addition, based on the incomplete character string entered in the entry field 502, entry candidates generated by a predictive conversion function provided by the web content are displayed as a predicted search keyword list 503 under the entry field 502 and arranged side by side.

The user selects a character string to be entered from among the entry candidates displayed in the entry candidate display field 602 during the character entry using the software keyboard 601, thereby completing the entry of the search keyword in the entry field 502. The user may select a character string to be entered from among the entry candidates displayed in the predicted search keyword list 503, thereby completing the entry of the search keyword to the entry field 502.

The predictive conversion function of the IME associates an entered character string with a result of converting the entered character string, causes the entered character string and the conversion result to be stored, and executes learning, thereby improving the accuracy of conversion.

However, when the user selects a search keyword from among entry candidates displayed in the predicted search keyword list 503 during the time when the user uses the software keyboard 601 to enter a character with a function of the IME, the IME treats the entry performed using the software keyboard 601 as interrupted entry.

For example, when a character entered by the user is autocompleted by the autocomplete function provided by the web content, a result of predictive conversion is not reflected in the IME and not learned, and the accuracy of the predictive conversion by the IME is not improved.

Hereinafter, an embodiment of a control method, a computing device, and a control program is described with reference to the drawings. The following embodiment, however, is an example and is not intended to exclude the application of various variation examples and techniques that are not clarified in the embodiment. For example, the embodiment may be implemented in various forms (including a combination of the embodiment and a variation example) without departing from the gist of the embodiment. The drawings are not intended to illustrate that only the drawn components are provided, but the embodiment may include other functions and so on.

Figure 1:
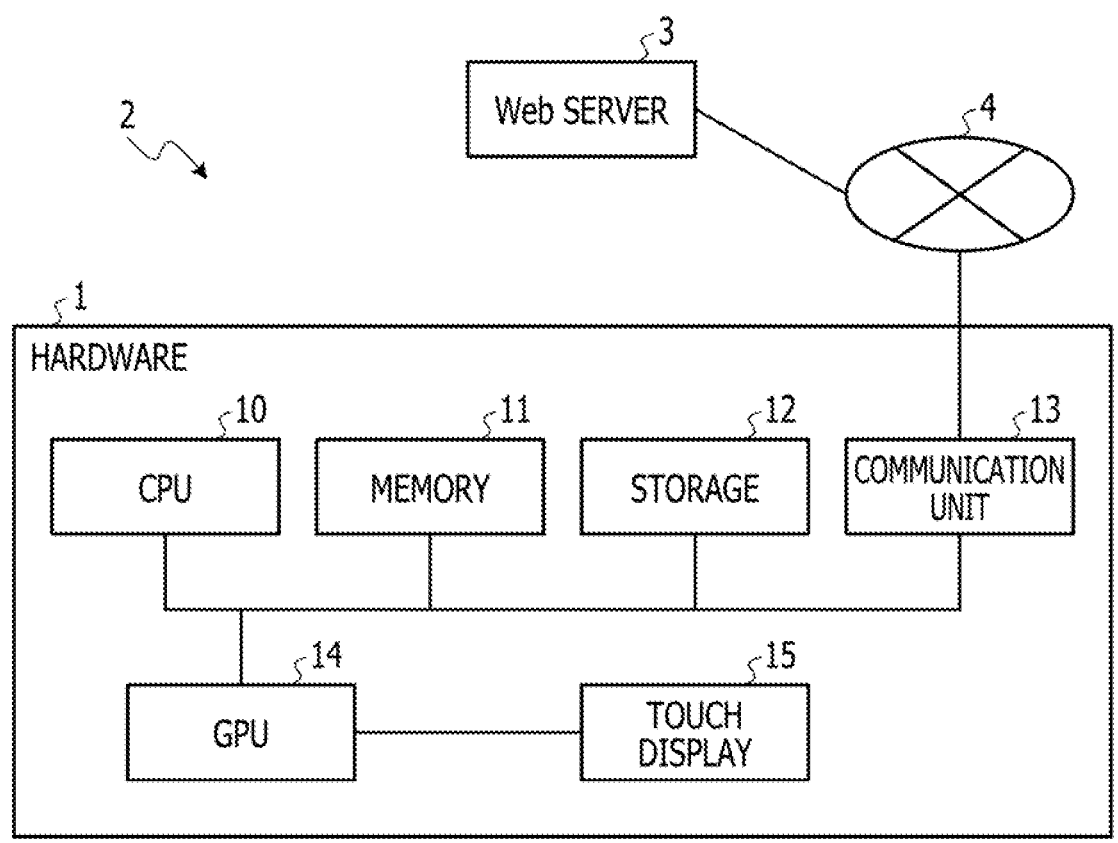
FIG. 1 is a diagram illustrating a hardware configuration of a computing device according to an example of an embodiment.

FIG. 1 is a diagram illustrating a configuration of a computing system 2 including a computing device 1 according to an example of the embodiment. The computing system 2 includes a web server 3 and the computing device 1, as illustrated in FIG. 1. The computing device 1 and the web server 3 are connected to and able to communicate with each other via a network 4.

The computing device 1 is a smartphone (multifunctional mobile phone), a personal digital assistant (PDA), a personal computer (PC), a tablet PC, a mobile phone, or the like. An example in which the computing device 1 is a smartphone is described below.

The computing device 1 includes, as hardware, a central processing unit (CPU) 10, a memory 11, storage 12, a communication unit 13, a graphics processing unit (GPU) 14, and a touch display 15.

The storage 12 is a storage device such as a hard disk drive (HDD), a solid state drive (SSD), or a storage class memory (SCM), and stores various data.

The memory 11 is a storage memory including a read only memory (ROM) and a random access memory (RAM). In the ROM of the memory 11, an operating system (OS), a software program (control program) for autocomplete control, and data for the program may be stored. The software program for the autocomplete control includes a software program for enabling a function as a browser 20 described later and a software program for enabling a function as an IME 30 described later.

A portion or all of the OS, the software program for the autocomplete control, and the data for the program may be stored in the storage 12.

The software program stored in the memory 11 is appropriately read and executed by the CPU 10. The RAM of the memory 11 is used as a primary storage memory or a working memory.

The communication unit 13 is a communication interface connectable to the network 4 and configured to transmit and receive data to and from another computer such as the web server 3 via the network 4. The network 4 is, for example, a local area network (LAN). The communication unit 13 is, for example, a radio LAN module or a LAN card.

The GPU 14 is a processing device for executing image processing. The GPU 14 is configured to draw an image, which is displayed on the touch display 15.

The touch display 15 is, for example, formed by unifying a function as a display device such as a liquid crystal display and a function as a position input device such as a touch pad. Thus, the touch display 15 has a function as a display device and a function as an input device.

The CPU 10 is a processing device, which executes various control or calculation and enables various functions by executing the OS stored in the memory 11 and the program stored in the memory 11. Thus, the CPU 10 enables the function as the browser 20 (refer to FIG. 2) and the function as the IME 30 (refer to FIG. 3).

The program (control program) for enabling the function as the browser 20, and the program for enabling the function as the IME 30 are recorded in a computer-readable recording medium and provided. The computer-readable recording medium is, for example, a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disc, a magnetic disk, an optical disc, a magneto-optical disc, or the like. A computer reads the programs from the recording medium, transfers the read programs to an internal or external storage device, causes the programs to be stored in the storage device, and uses the programs. For example, the programs may be recorded in a storage device (recording medium) such as a magnetic disk, an optical disc, or a magneto-optical disc and may be provided from the storage device to the computer via a communication path.

To enable the function as the browser 20 and the function as the IME 30, the programs stored in the internal storage device (RAM or ROM of the memory 11 in the embodiment) are executed by a microprocessor (CPU 10 in the embodiment) of the computer. In this case, the computer may read and execute the programs recorded in the recording medium.

Figure 2:
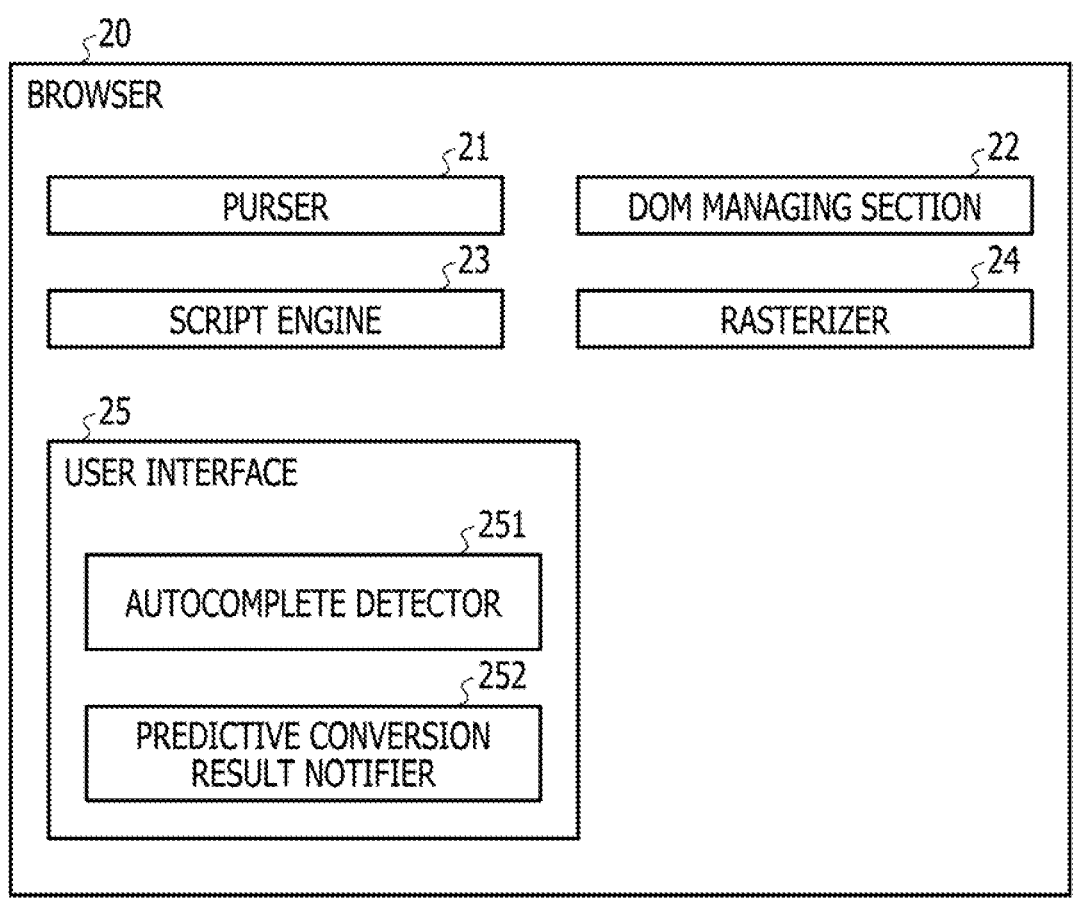
FIG. 2 is a diagram exemplifying a functional configuration of a browser of the computing device according to the example of the embodiment.
Figure 3:
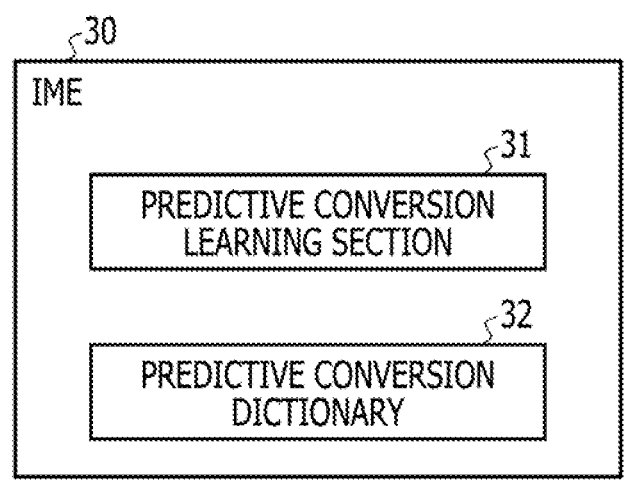
FIG. 3 is a diagram exemplifying a functional configuration of an IME of the computing device according to the example of the embodiment.

FIG. 2 is a diagram exemplifying a functional configuration of the browser 20 in the computing device 1 according to the example of the embodiment. FIG. 3 is a diagram exemplifying a functional configuration of the IME 30 in the computing device 1 according to the example of the embodiment.

The browser 20 is a web browser, which displays information provided by the web server 3 on the touch display 15 to present the information to a user. An example in which the browser 20 is a Hyper Text Markup Language (HTML) browser that enables an HTML document, described in HTML, to be displayed in the computing device 1 is described below. For example, the browser 20 displays a web page described in HTML on the touch display 15.

An HTML document to be used to display a web page is, for example, acquired (downloaded) from the web server 3 via the communication unit 13. The HTML document may be read from the storage 12, variously modified, and enabled, for example.

Figure 4:
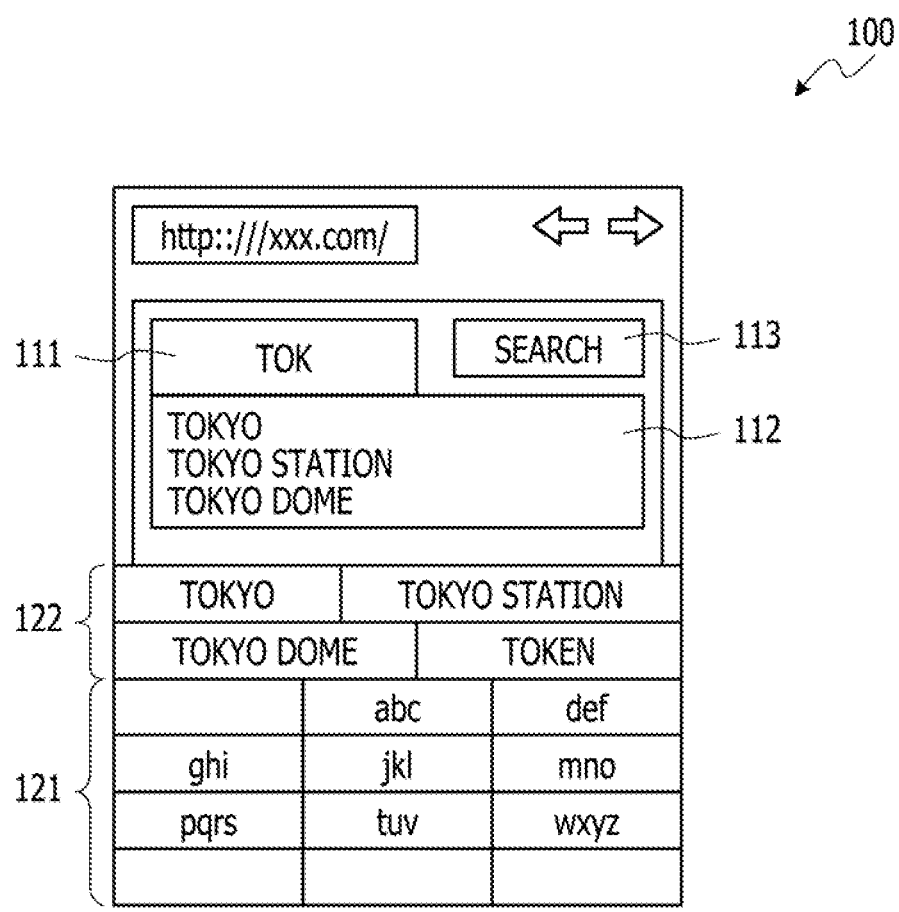
FIG. 4 is a diagram exemplifying an entry screen displayed on a touch display of the computing device according to the example of the embodiment.

FIG. 4 is a diagram exemplifying an entry screen 100 displayed on the touch display 15 of the computing device 1 according to the example of the embodiment.

The entry screen 100 exemplified in FIG. 4 is a web page described in HTML and includes an entry field 111, a first predictive conversion candidate display field 112, a search button 113, a software keyboard 121, and a second predictive conversion candidate display field 122.

The entry screen 100 is, for example, used to execute a keyword search. By entering a search keyword in the entry field 111 and selecting the search button 113, the entered keyword is transmitted to a search server (not illustrated) and searched. The web server 3 may function as the search server.

A result of searching the keyword is transmitted to the computing device 1 and displayed on the touch display 15. The displaying of the search result on the touch display 15 may be enabled using one or more of various known methods and will not be described.

The software keyboard 121 is an input section to be used by the user to enter a character. The user performs a touch operation or the like on the software keyboard 121 to enter a character. The character entered using the software keyboard 121 is displayed in, for example, the entry field 111. A function of entering a character using the software keyboard 121 is enabled by the IME 30. Instead of the software keyboard 121, a hardware keyboard may be used.

The entry field 111 is an HTML component in which a character is able to be entered by the user. The entry field 111 is a region that is included in an HTML content and in which a character is able to be entered. The entry field 111 is, for example, defined as an "input" region in which a character is to be entered. The entry screen 100 may include multiple components (regions) in which a character is able to be entered. The entry field 111 is hereinafter referred to as component "A" in some cases.

To enter a kanji character in the entry field 111, the user uses the software keyboard 121 to enter a hiragana character and selects a conversion button (not illustrated), and the IME 30 converts the entered hiragana character into the kanji character.

The first predictive conversion candidate display field 112 is displayed under the entry field 111. Every time key entry is performed, the first predictive conversion candidate display field 112 is displayed in JavaScript as an entry candidate under the "input" region in the web content in which the entry field 111 (component "A") exists, where a character is to be entered.

A candidate character string (or an entry candidate) predicted to be entered by the user is displayed in the first predictive conversion candidate display field 112. An entry candidate to be displayed in the first predictive conversion candidate display field 112 is predicted by the web content provided by the web server 3, based on a character entered in the entry field 111.

The web content generates one or more candidate character strings (or entry candidates or predicted search keywords) predicted to be entered, based on an incomplete character string entered in the entry field 111, and displays the one or more candidate character strings in the first predictive conversion candidate display field 112 so that the one or more candidate character strings are arranged side by side. The web content has a function of displaying an entry candidate in the first predictive conversion candidate display field 112 based on a character entered in an HTML content component displayed by the browser 20. The first predictive conversion candidate display field 112 is, for example, displayed in JavaScript.

When a character is entered in the entry field 111, the web content predicts, based on the entered character (entered character information), a character string to be entered and generates candidate character information (or an entry candidate) that is a candidate for conversion of the entered character information. Generating candidate character information (or an entry candidate), which is a candidate for conversion of entered character information, is hereinafter referred to as predicting an entry candidate in some cases.

The predicted candidate character information (or an entry candidate) is displayed by the browser 20 in the first predictive conversion candidate display field 112. For example, the browser 20 processes an HTML document forming a web page, thereby displaying one or more entry candidates generated by the web content on the touch display 15.

In an example illustrated in FIG. 4, a character string "TOK" is entered in the entry field 111, and three entry candidates, which are character strings indicating "Tokyo", "Tokyo station" and "Tokyo dome", are arranged side by side in a vertical direction in the first predictive conversion candidate display field 112.

The prediction of candidate character information (or one or more entry candidates) by the web content may be enabled by an entry assistant function (autocomplete function or the like) using HTML or by using one or more of known various methods. A function of displaying one or more entry candidates in the first predictive conversion candidate display field 112 is known as a function of the web content, and will not be described.

The user may select an entry candidate to be entered from among multiple entry candidates displayed in the first predictive conversion candidate display field 112 during the entry of a character in the entry field 111, thereby completing the character entry in the entry field 111 without entering a remaining portion of a search keyword.

When entry candidates are displayed in the first predictive conversion candidate display field 112, and the user selects an entry candidate from among the displayed entry candidates, the autocomplete function of completing character entry in the entry field 111 is enabled by the HTML content (web content).

The autocomplete function of completing character entry performed by the user is provided by an external function that is the web content or the like and is different from the IME 30. The autocomplete function is hereinafter referred to as external autocomplete function in some cases.

Candidates (or entry candidates) for a character string to be entered by the user are predicted by the IME 30 based on a character entered in the entry field 111 and are displayed in the second predictive conversion candidate display field 122.

The entry candidates displayed in the second predictive conversion candidate display field 122 are provided by the IME 30 described later. In the example illustrated in FIG. 4, the character string "TOK" is entered in the entry field 111, and four entry candidates, which are character strings indicating "Tokyo", "Tokyo station", "Tokyo dome" and "Token", are displayed in the second predictive conversion candidate display field 122.

The IME 30 generates one or more candidate character strings (or entry candidates or predicted search keywords) predicted to be entered, based on an incomplete character string entered in the entry field 111, and displays the one or more candidate character strings in the second predictive conversion candidate display field 122 so that the one or more candidate character strings are arranged side by side.

The user may select an entry candidate to be entered from among multiple entry candidates displayed in the second predictive conversion candidate display field 122 during the entry of a text in the entry field 111, thereby completing the character entry in the entry field 111 without entering a remaining portion of a search keyword.

Upon acquiring content information (of the web content) from the web server 3 or the like, the browser 20 displays an image (for example, the entry screen 100) corresponding to the acquired web content on the touch display 15.

The browser 20 displays, in a specific region (for example, the entry field 111) on the entry screen 100, a character entered using the software keyboard 121 or a character selected in the first or second predictive conversion candidate display field 112 or 122.

Thus, the browser 20 functions as a display controller that executes control to display the entry screen 100 on the touch display 15.

The browser 20 includes functions as a purser 21, a document object model (DOM) managing section 22, a script engine 23, a rasterizer 24, and a user interface 25, as illustrated in FIG. 2.

The purser 21 analyzes an HTML document and generates internal information that is referred to as DOM.

The DOM managing section 22 manages the DOM generated by the purser 21. The DOM managing section 22 holds the DOM and uses the rasterizer 24 in accordance with the DOM to visualize the DOM. The visualized DOM is displayed by the GPU 14 on the touch display 15.

The DOM managing section 22 has a function of managing characters included in the HTML document displayed on the touch display 15. Thus, the DOM managing section 22 may recognize information of the characters displayed on the touch display 15 and the like in real time and detect a change in the characters displayed on the touch display 15.

The script engine 23 interprets and executes a script included in the HTML document. The script engine 23 is, for example, a JavaScript engine and interprets and executes a script described in Java. Java and JavaScript are registered trademarks.

The user interface 25 receives entry performed by the user via the touch display 15. For example, the user interface 25 detects that the touch display 15 has been touched by the user (or the user interface 25 detects a touch event). Then, the user interface 25 outputs information of the position (coordinates) of a touched portion of the touch display 15.

The user interface 25 has a function as an autocomplete detector 251 and a function as a predictive conversion result notifier 252.

The autocomplete detector 251 detects that autocomplete has been executed by a function other than the IME 30 on the component "A" of the entry screen 100 during the time when the user uses the IME 30 to enter a character.

For example, the autocomplete detector 251 determines whether the user has used the IME 30 to enter a character, based on whether the position of a portion existing on the touch display 15 and touched by the user is included in a region for which the IME 30 provides the function. For example, when a character string displayed in the first predictive conversion candidate display field 112 (refer to FIG. 4) provided by the web content is selected during the time when the user uses the IME 30 to enter a character string in the component "A", the autocomplete detector 251 detects that the entered character string has been autocompleted by the function other than the IME 30.

When the autocomplete detector 251 detects that the entered character string has been autocompleted by the function other than the IME 30 during the time when the user uses the IME 30 to enter the character, the predictive conversion result notifier 252 notifies autocomplete result information indicating a detail of the autocomplete to the IME 30.

FIG. 5 is a diagram exemplifying the autocomplete result information notified to the IME 30 in the computing device 1 according to the example of the embodiment. As illustrated in FIG. 5, in the autocomplete result information, the entered character string is associated with the autocomplete result.

The entered character string is a character string already entered in the entry field 111 before the entered character string is autocompleted by the external autocomplete function. In other words, the entered character string is before the conversion or before the execution of the autocomplete by the external autocomplete function. The entered character string is before the character string displayed in a character entry region (for example, the entry field 111) on the entry screen 100 is changed when the user touches the touch display 15.

The autocomplete result is a character string serving as an entry candidate and selected in the first predictive conversion candidate display field 112 when the entered character string is autocompleted by the external autocomplete function. In other words, the autocomplete result is the character string after the conversion or after the execution of the autocomplete by the external autocomplete function. The autocomplete result is after the character string displayed in the character entry region (for example, the entry field 111) on the entry screen 100 is changed when the user touches the touch display 15.

In the autocomplete result information exemplified in FIG. 5, the character string "TOK" is indicated as the entered character string, and the character string indicating "Tokyo" is indicated as the autocomplete result.

For example, when the user uses the software keyboard 121 to enter the character string "TOK" in the entry field 111, and selects the string indicating "Tokyo" from among multiple entry candidates displayed in the first predictive conversion candidate display field 112 in a state in which the string "TOK" is displayed in the entry field 111, the predictive conversion result notifier 252 generates the autocomplete result information exemplified in FIG. 5. Then, the predictive conversion result notifier 252 notifies the generated autocomplete result information to the IME 30.

For example, the predictive conversion result notifier 252 notifies the generated autocomplete result information to a destination corresponding to the IME 30. For example, the predictive conversion result notifier 252 transmits the autocomplete result information to the memory 11 and causes the autocomplete result information to be stored in a specific storage region of the memory 11. The autocomplete result information is given by the browser 20 to the IME 30 when a predictive conversion learning section 31 (described later) of the IME 30 reads the autocomplete result information stored in the memory 11.

The IME 30 is character entry assistant software for assisting user's character entry and enables a character, which does not exist on the software keyboard 121, to be entered using a key on the software keyboard 121. The IME 30 may assist the entry of a Japanese character.

The IME 30 enables a character to be entered using the software keyboard 121 and executes a process of converting a hiragana character entered using the software keyboard 121 into another Japanese character such as a kanji character or a katakana character.

For example, the IME 30 predicts, based on a character entered using the software keyboard 121, a character string to be entered by the user and displays the predicted character string as an entry candidate in the second predictive conversion candidate display field 122.

When the user selects an entry candidate to be entered from among multiple entry candidates displayed in the second predictive conversion candidate display field 122, the IME 30 inputs, to the entry field 111, the selected entry candidate, which is a character string.

The IME 30 has a function as the predictive conversion learning section 31 and a function as a predictive conversion dictionary 32, as illustrated in FIG. 3.

The predictive conversion dictionary 32 associates a character string to be converted with a registered character string and stores (manages) the character strings. For example, in the predictive conversion dictionary 32, a hiragana character string is registered as the character string to be converted, a kanji character string is registered as the registered character string, and the character strings are associated with each other and stored. The character string to be converted may be referred to as character string to be read.

Associating the character string to be converted with the registered character string and storing the character strings in the predictive conversion dictionary 32 are hereinafter referred to as learning in some cases.

The embodiment describes an example in which a character string to be converted is a hiragana character string and a registered character string is a kanji character string. The embodiment, however, is not limited to this. The character string to be converted may be a character string other than a hiragana character string, and the registered character string may be a character string other than a kanji character string.

The IME 30 references the predictive conversion dictionary 32 based on a hiragana character entered using the software keyboard 121. When the entered hiragana character is already registered in the predictive conversion dictionary 32, the IME 30 displays, as an entry candidate (candidate for predictive conversion) for the entered hiragana character, a kanji character string associated with the entered hiragana character in the second predictive conversion candidate display field 122. A Japanese conversion function of the IME 30 is known and will not be described in detail.

The predictive conversion learning section 31 causes both the character string to be converted and the registered character string to be stored in the predictive conversion dictionary 32, and executes control to cause the predictive conversion dictionary 32 to learn the character strings. For example, when the user selects a conversion button (not illustrated) to convert a hiragana character string into a kanji character string, the predictive conversion learning section 31 causes the predictive conversion dictionary 32 to learn the character string entered in the entry field 111 before the conversion and the selected character string.

For example, the predictive conversion learning section 31 treats, as the character string to be converted, the character string entered in the entry field 111 before the conversion, treats the selected character string as the registered character string, and causes the predictive conversion dictionary 32 to learn the character strings.

In addition, the predictive conversion learning section 31 may cause the predictive conversion dictionary 32 to learn a registered character string and a character string, which is to be converted and have been entered by the user on a word registration screen (not illustrated) displayed on the touch display 15. Thus, the predictive conversion dictionary 32 functions as a user definition dictionary that may learn a character string arbitrarily entered by the user.

The predictive conversion learning section 31 causes the predictive conversion dictionary 32 to learn the autocomplete result information notified by the predictive conversion result notifier 252.

For example, the predictive conversion learning section 31 treats the entered character string of the autocomplete result information as the character string to be converted, treats the autocomplete result as the registered character string, and causes the predictive conversion dictionary 32 to learn the character strings.

An example of transitions, caused by user operations, of the entry screen in the computing device 1 configured as described above according to the example of the embodiment is described below with reference to FIG. 6.

Figure 6:
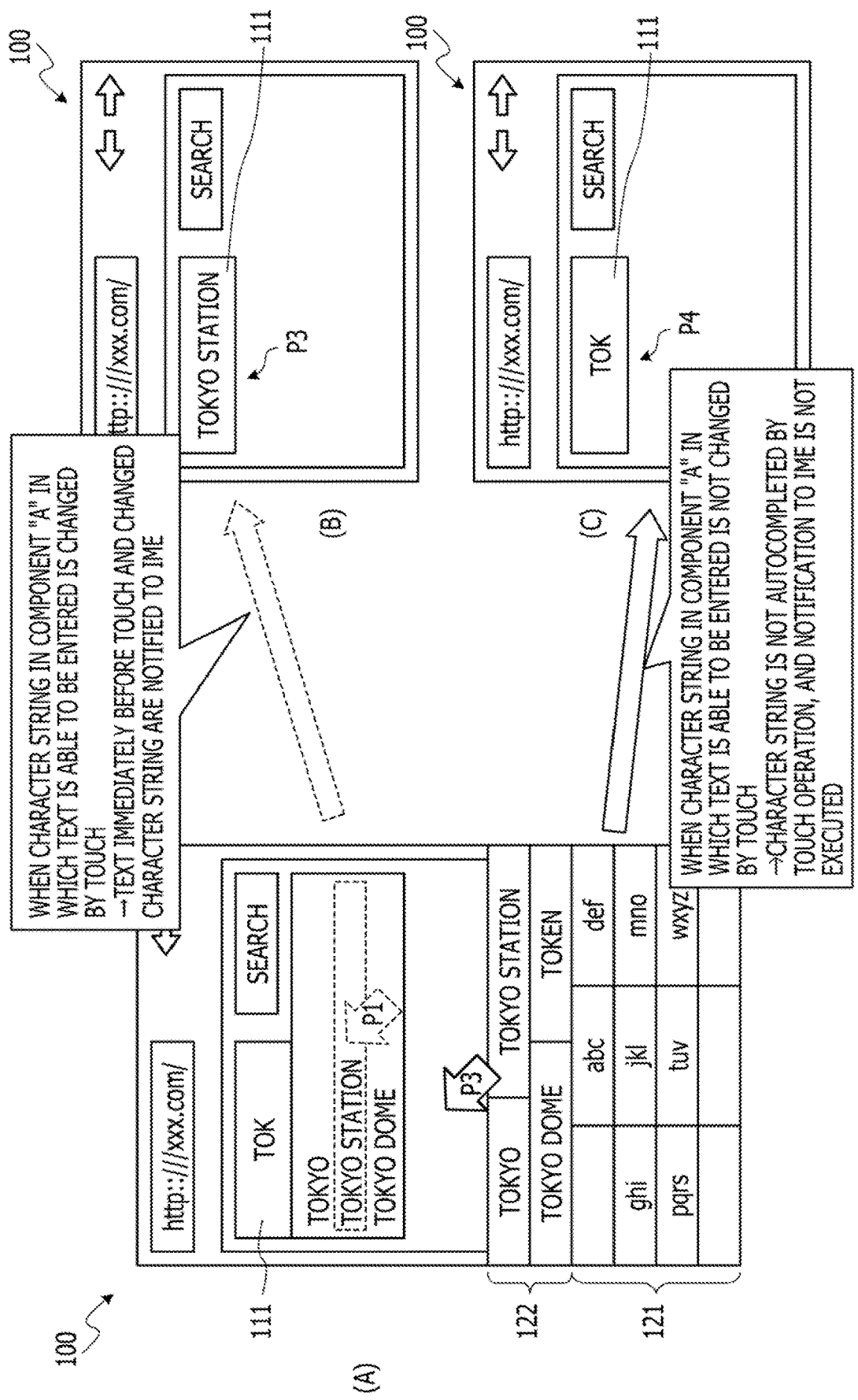
FIG. 6 is a diagram illustrating an example of transitions, caused by user operations, of the entry screen in the computing device according to the example of the embodiment.

In FIG. 6, a symbol A indicates a state of the entry screen 100 during character entry, and symbols B and C indicate states of the entry screen 100 after transitions from the state indicated by the symbol A. In examples indicated by the symbols B and C, portions of the entry screen 100 are illustrated.

In FIG. 6, on the entry screen in the state indicated by the symbol A, the character string "TOK" is entered in the entry field 111, and multiple entry candidates are displayed in each of the first and second predictive conversion candidate display fields 112 and 122.

When an entry candidate (for example, the kanji character string indicating "Tokyo station") displayed in the first predictive conversion candidate display field 112 is selected by the user on the entry screen 100 in the state indicated by the symbol A in FIG. 6, the entry screen 100 transitions from the state indicated by the symbol A transitions to the state indicated by the symbol B.

For example, the user touches an entry candidate displayed in the first predictive conversion candidate display field 112 on the touch display 15 (refer to an arrow P1) to select a component of the HTML content. By selecting this, a character string displayed in the entry field 111 (component "A") in which a character is able to be entered changes from the character string "TOK" to the character string indicating "Tokyo station" (refer to an arrow P2).

When a character string entered in the component "A" is changed immediately after a touch event within the first predictive conversion candidate display field 112 is detected, the autocomplete detector 251 of the browser 20 determines that the entered character string has been autocompleted by the HTML content.

When the autocomplete detector 251 detects that the autocomplete has been executed by the function other than the IME 30 during the time when the user uses the IME 30 to enter a character, the predictive conversion result notifier 252 notifies autocomplete result information indicating a detail of the autocomplete to the IME 30.

For example, the predictive conversion result notifier 252 notifies the IME 30 of the character string entered in the component "A" before the touch event and a character string after the change caused by the touch event as autocomplete result information. In the example illustrated in FIG. 6, the predictive conversion result notifier 252 notifies the IME 30 (predictive conversion learning section 31) of the character string "TOK" and the character string indicating "Tokyo station" as the autocomplete result information.

When the user touches a portion other than components in which a character is able to be entered during the time when the user uses the IME 30 to enter a character (refer to an arrow P3) on the entry screen 100 in the state indicated by the symbol A in FIG. 6, the entry performed using the IME 30 is canceled.

In this case, as indicated by the symbol C, the character string "TOK" entered in the entry field 111 (component "A") in which a character is able to be entered does not change (refer to an arrow P4).

When a character string entered in the component "A" immediately after a touch event is detected does not change, the autocomplete detector 251 of the browser 20 determines that the character string has not been autocompleted by the HTML content. In this case, the predictive conversion result notifier 252 does not notify the IME 30 of autocomplete result information.

In the example illustrated in FIG. 6, even when a touch operation is performed in any of the regions indicated by the arrows P1 and P3, focus on the entry field 111 as the input region is canceled, and the browser 20 determines that the entry has been interrupted. Then, the browser 20 terminates the IME 30. The IME 30 receives a termination request from the browser 20, discards a character string being entered, and is terminated in accordance with the termination request.

As described above, autocomplete result information includes a character string (entered character string) entered before a touch operation and a character string (registered character string) after a change in the entered character string. In the computing device 1, the predictive conversion result notifier 252 notifies the IME 30 of not only the character string after the change as autocomplete result information. This is due to the following reason.

As exemplified by the symbol A in FIG. 6, when the user uses the software keyboard 121 to enter up to the character string "TOK" in the entry field 111, and touches the region indicated by the arrow P3 on the entry screen 100 in a state in which the character string "TOK" is displayed in the entry field 111, the IME 30 is terminated in accordance with the termination request from the browser 20.

After that, when the user enters a character string "Y" in the entry field 111, the autocomplete function of the HTML content displays a candidate for conversion of a character string "Tokyo". Since the character string "TOK" is discarded by the IME 30 upon the termination request from the browser 20, the IME 30 recognizes (holds) only the character "Y".

In this state, when the character string "Toky" is converted into the character string indicating "Tokyo station" due to the selection of the character string displayed in the first predictive conversion candidate display field 112, and the predictive conversion result notifier 252 notifies the IME 30 of only the character string indicating "Tokyo station" after the conversion, the IME 30 treats the character "Y" to be converted and the registered character string indicating "Tokyo station" as a pair, and does not execute intended learning.

This, however, does not apply to the case where the IME 30 holds histories of entered texts. The browser 20 may notify the IME 30 of only a changed text. When the two entered character strings, which are the character string "TOK" and the character "Y", are stored and the browser 20 notifies the IME 30 of only the character string (registered character string) indicating "Tokyo station" after the change, the IME 30 may learn the character string "Toky" and the character string indicating "Tokyo station" as a pair to improve the accuracy of the predictive conversion.

Next, an overview of the autocomplete function of autocompleting an entered character in the computing device 1 according to the example of the embodiment is described with reference to a flowchart (steps S1 to S7) illustrated in FIG. 7.

In step S1, the user interface 25 (autocomplete detector 251) of the browser 20 detects a touch (touch event) by the user on the touch display 15. For example, the user touches a position within the entry field 111 on the touch display 15 to enter a character.

In step S2, the autocomplete detector 251 confirms whether the component "A" in which a character is able to be entered exists at a position (hereinafter merely referred to as touched position) corresponding to the touched position on the entry screen 100 displayed on the touch display 15. In this example, the entry field 111 corresponds to the component "A".

Figure 7:
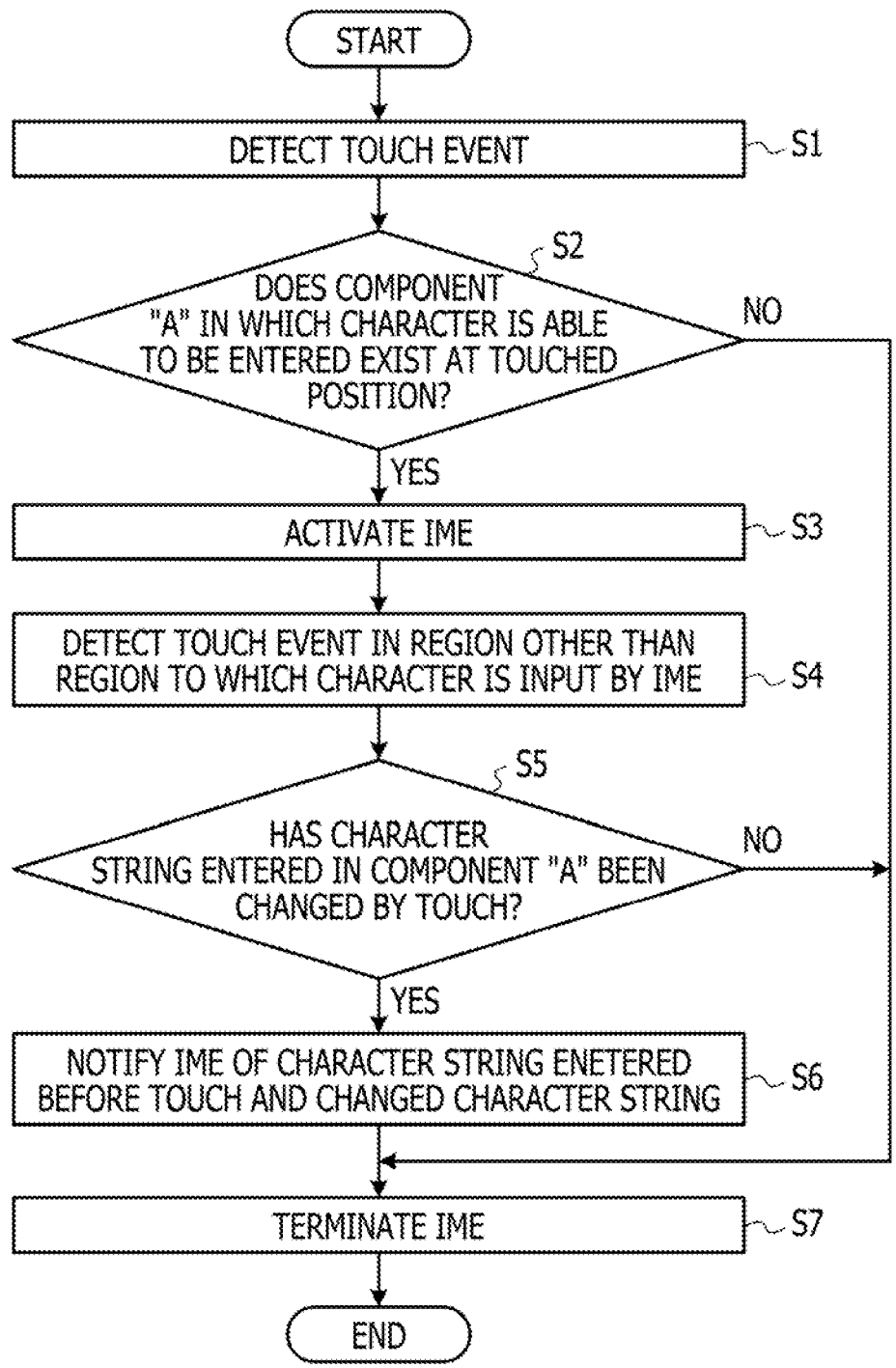
FIG. 7 is a flowchart describing an overview of an autocomplete function of autocompleting a character in the computing device according to the example of the embodiment.

When the component "A" that is the entry field 111 and in which a character is able to be entered exists at the touched position as a result of the confirmation (YES in step S2), a process of the flowchart illustrated in FIG. 7 proceeds to step S3.

In step S3, the IME 30 is activated. The user uses the software keyboard 121 to start entering a character. For example, the user enters the character string "TOK".

When a character is entered in the entry field 111, the browser 20 displays, based on the character entered in the entry field 111, one or more entry candidates provided by the web content in the first predictive conversion candidate display field 112. For example, the browser 20 displays the character strings indicating "Tokyo", "Tokyo station" and "Tokyo dome" as entry candidates in the first predictive conversion candidate display field 112.

In addition, the IME 30 predicts, based on a character entered using the software keyboard 121, one or more character strings to be entered by the user and displays the predicted one or more character strings as one or more entry candidates in the second predictive conversion candidate display field 122. For example, the IME 30 displays the character strings indicating "Tokyo", "Tokyo station", "Tokyo dome" and "Token", as entry candidates in the second predictive conversion candidate display field 122.

In step S4, the autocomplete detector 251 detects that the user has touched a region (or the autocomplete detector 251 detects a touch event), which is within the entry screen 100 and is not a region to which a character is input by the IME 30. For example, the user performs a touch operation on the touch display 15 to select a single entry candidate from among multiple entry candidates displayed in the first predictive conversion candidate display field 112.

In step S5, the autocomplete detector 251 confirms, based on the touch event detected in step S4, whether a character string entered in the component "A" has been changed. For example, the autocomplete detector 251 confirms whether the character string entered in the component "A" before the touch event detected in step S4 has been changed to a character string in the component "A" after the touch event detected in step S4.

When the character string entered in the component "A" has been changed by the touch (YES in step S5), the process proceeds to step S6.

In step S6, the predictive conversion result notifier 252 associates the character string (character string to be converted) entered in the component "A" before the detected touch with the character string (registered character string) after the change in the component "A" and notifies the IME 30 of the character strings as autocomplete result information.

In step S7, the browser 20 issues a termination request to the IME 30. Then, the IME 30 is terminated and the character entry process is terminated.

When the component "A" in which a character is able to be entered does not exist at the touched position as a result of the confirmation (NO in step S2), the process proceeds to step S7.

When the character string in the component "A" has not been changed by the touch (NO in step S5), the process proceeds to step S7.

Figure 8:
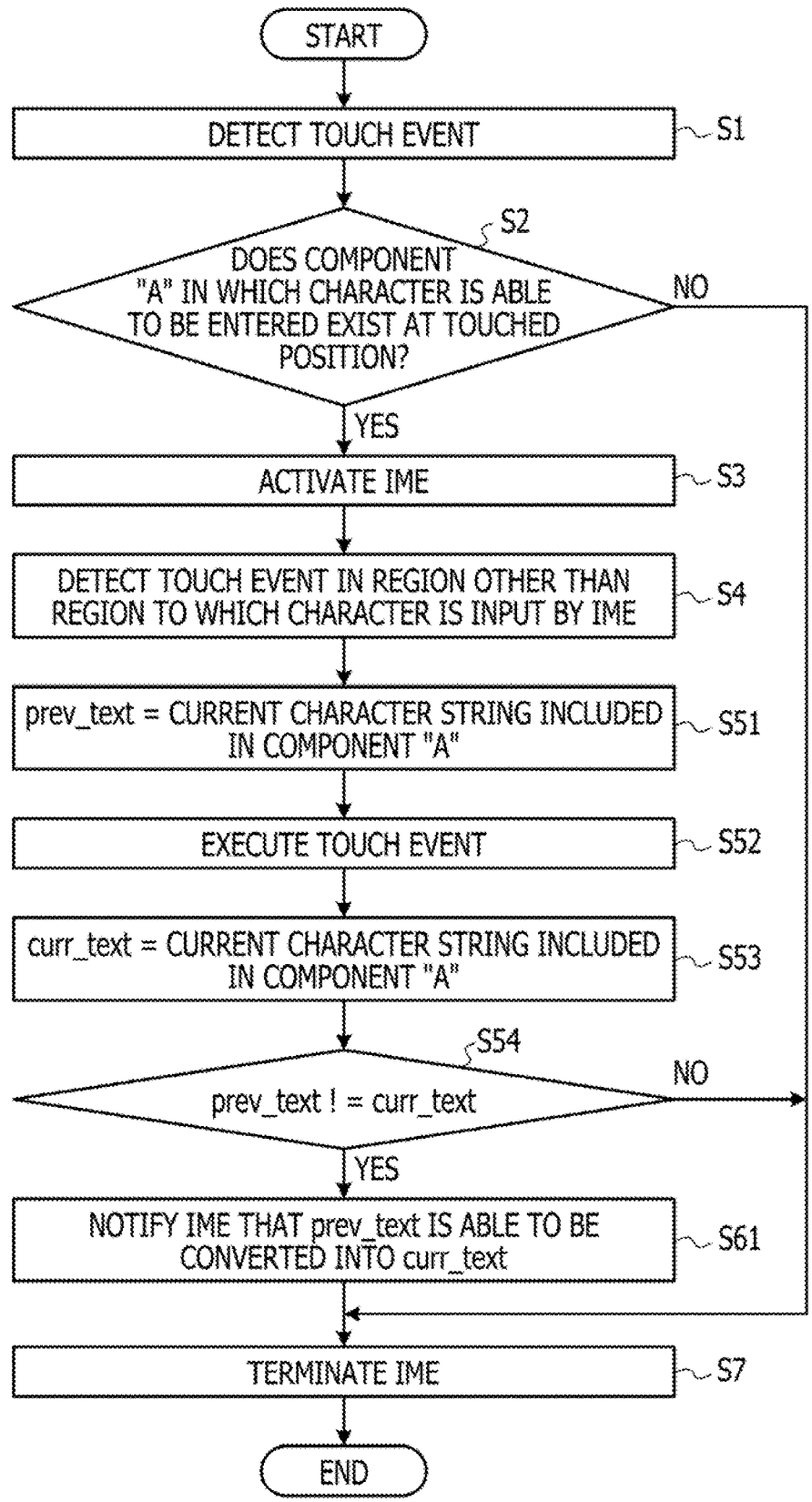
FIG. 8 is a flowchart describing details of a process by the autocomplete function of autocompleting a character in the computing device according to the example of the embodiment.

Next, details of a process by the autocomplete function of autocompleting an entered character in the computing device 1 according to the example of the embodiment are described with reference to a flowchart (steps S1 to S4, S51 to S54, S61, and S7) illustrated in FIG. 8.

The following example assumes that the web content has a region (for example, the component "A"), which is the "input" region and in which a character is to be entered, and displays an entry candidate (in the first predictive conversion candidate display field 112) in JavaScript under the "input" region every time key entry is performed. The autocomplete detector 251 acquires a character within the content from the DOM managing section 22.

In the following process, a variable prev_text and a variable curr_text are used. Character strings are set in the variables.

In step S1, the user interface 25 (autocomplete detector 251) of the browser 20 detects a touch (touch event) by the user on the touch display 15. For example, the user touches a position within the entry field 111 on the touch display 15 to enter a character.

In step S2, the autocomplete detector 251 confirms whether the component "A" in which a character is able to be entered exists at a position (hereinafter merely referred to as touched position) corresponding to the touched position on the entry screen 100 displayed on the touch display 15. In this example, the entry field 111 corresponds to the component "A".

When the component "A" that is the entry field 111 and in which a character is able to be entered exists at the touched position as a result of the confirmation (YES in step S2), the process proceeds to step S3.

In step S3, the IME 30 is activated. The user uses the software keyboard 121 to start entering a character. For example, the user enters the character string "TOK".

When a character is entered in the entry field 111, the browser 20 displays, based on the character entered in the entry field 111, one or more entry candidates provided by the web content in the first predictive conversion candidate display field 112. For example, the browser 20 displays the character strings indicating "Tokyo", "Tokyo station" and "Tokyo dome" as entry candidates in the first predictive conversion candidate display field 112.

The IME 30 predicts, based on the character entered using the software keyboard 121, one or more character strings to be entered by the user and displays the predicted one or more character strings as one or more entry candidates in the second predictive conversion candidate display field 122. For example, the IME 30 displays the character strings indicating "Tokyo", "Tokyo station", "Tokyo dome" and "Token", as entry candidates in the second predictive conversion candidate display field 122.

In step S4, the autocomplete detector 251 detects that the user has touched a region (or the autocomplete detector 251 detects a touch event), which is within the entry screen 100 and is not a region to which a character is input by the IME 30.

For example, the user uses his or her finger to touch the position of a single entry candidate displayed in the first predictive conversion candidate display field 112 on the touch display 15 to select the single entry candidate from among multiple entry candidates displayed in the first predictive conversion candidate display field 112. Then the autocomplete detector 251 detects the touch.

In step S51, the autocomplete detector 251 sets, in prev_text, a character string displayed in the component "A" or a current character string (for example, the character string "TOK") included in the component "A".

In step S52, a process based on the touch event detected in step S4 is executed (the execution of the touch event). For example, the browser 20 displays, in the entry field 111, a character string, which is the entry candidate displayed in the first predictive conversion candidate display field 112 and touched by the user, and the browser 20 treats the displayed character string as an entered character string. In steps S4 to S52, the entry candidate is selected by the user from among the entry candidates displayed in the first predictive conversion candidate display field 112 and is entered.

In step S53, the autocomplete detector 251 sets, in curr_text, the character string displayed in the component "A" or the current character string (for example, the current kanji character string indicating "Tokyo station") included in the component "A".

In step S54, the autocomplete detector 251 compares a value of prev_text with a value of curr_text. When the value of prev_text and the value of curr_text do not match as a result of the comparison (YES in step S54), the process proceeds to step S61.

It may be considered that the difference between the value of prev_text and the value of curr_text indicates that the entry operation has been performed in steps S4 to S52 to select the entry candidate displayed in the first predictive conversion candidate display field 112. For example, the value of prev_text is converted into the value of curr_text.

In step S61, the predictive conversion result notifier 252 notifies the IME 30 of autocomplete result information indicating the value of prev_text as the entered character string and the value of curr_text as the result of autocompleting the character string. For example, the predictive conversion result notifier 252 notifies the IME 30 that the value of prev_text is able to be converted into the value of curr_text. After that, the process proceeds to step S7.

In step S7, the browser 20 issues a termination request to the IME 30. Then, the IME 30 is terminated and the character entry process is terminated.

When the component "A" in which a character is able to be entered does not exist at the touched position as a result of the confirmation (NO in step S2), the process proceeds to step S7.

When the value of prev_text and the value of curr_text match as a result of the comparison (NO in step S54), the process proceeds to step S7.

In the computing device 1 according to the example of the embodiment, the autocomplete detector 251 detects that the user has used the autocomplete function provided by the HTML content to enter a character string in the entry screen 100 during the time when the user uses the IME 30 to enter a character.

Then, the predictive conversion result notifier 252 notifies the IME 30 of an autocomplete result obtained by the autocomplete function provided by the HTML content as autocomplete result information.

In the IME 30, the predictive conversion learning section 31 causes the predictive conversion dictionary 32 to learn, as a character string to be converted and a registered character string, the entered character string and the autocomplete result that are included in the autocomplete result information notified by the predictive conversion result notifier 252.

For example, when an entered character string is autocompleted using the function other than the IME 30 during character entry using the IME 30, the autocomplete detector 251 determines that the entered character string (character string to be converted) is able to be converted into a character string (autocomplete result) to which the entered character string has been autocompleted. Then, the predictive conversion result notifier 252 feeds the autocomplete result information back to the IME 30. Thus, it may be possible to improve the accuracy of the prediction conversion by the IME 30.

For example, when the user uses the IME 30 to enter a character, and the entered character is autocompleted by the web content upon the character entry using the IME 30, the HTML browser feeds autocomplete result information of the autocomplete by the web content back to the IME 30. Thus, even when the user uses the autocomplete function (external autocomplete function) provided by the web content to perform predictive conversion on a character, the autocomplete may be reflected in the predictive conversion dictionary 32 of the IME 30, and the accuracy of a predictive conversion result of the IME 30 may be improved.

The present disclosure is not limited to the aforementioned embodiment and includes various modifications without departing from the gist of the disclosure.

The embodiment describes the example in which a character is entered in the entry field 111 (component "A") on the entry screen 100. The embodiment, however, is not limited to this. In recent years, a technique for executing a keyword search by entering a search keyword in an address bar of a browser has been known.

In the computing device 1, the autocomplete may be executed when a character such as a keyword is entered in an address bar, displayed on the touch display 15, of the browser 20. The address bar is a region in which an address of a web page displayed by the browser (or to be displayed by the user) is displayed. The address bar is referred to as location bar or Uniform Resource Locator (URL) bar in some cases.

Figure 9:
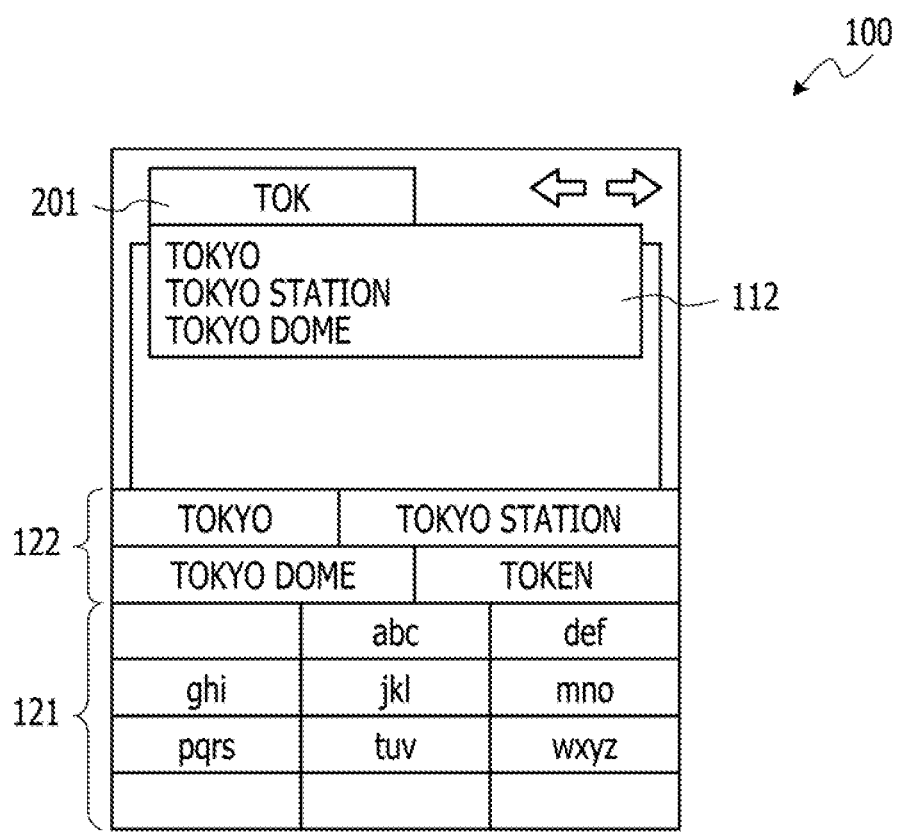
FIG. 9 is a diagram describing entry in an address bar, displayed on the touch display of the computing device according to a variation example of the embodiment, of a browser.

FIG. 9 is a diagram describing entry in the address bar 201, displayed on the touch display 15 of the computing device 1 according to a variation example of the embodiment, of the browser 20.

An example illustrated in FIG. 9 indicates a state in which the user enters a search keyword in the address bar 201 of the browser 20.

The entry screen 100 exemplified in FIG. 9 is a web page described in HTML, like the entry screen 100 exemplified in FIG. 4, and includes the address bar 201, the first predictive conversion candidate display field 112, the software keyboard 121, and the second predictive conversion candidate display field 122.

The search keyword may be entered in the address bar 201 to perform a keyword search. When an instruction to execute a search is input, an enter key is pressed, or the like after the entry of the search keyword in the address bar 201, the entered keyword is transmitted to the search server (not illustrated) and searched. A result of searching the keyword is transmitted to the computing device 1 and displayed on the touch display 15. The displaying of the search result may be enabled using one or more of various known methods and will not be described.

In the example illustrated in FIG. 9, the first predictive conversion candidate display field 112 is displayed under the address bar 201.

The web content generates one or more candidate character strings (or entry candidates or predicted search keywords) predicted to be entered, based on a character string entered in the address bar 201, and displays the one or more candidate character strings in the first predictive conversion candidate display field 112 so that the one or more candidate character strings are arranged side by side.

The user may select an entry candidate to be entered from among multiple entry candidates displayed in the first predictive conversion candidate display field 112 during character entry in the address bar 201, thereby completing the character entry in the address bar 201 without entering a remaining portion of the search keyword.

A function of displaying an entry candidate in the first predictive conversion candidate display field 112 based on a character entered in the address bar 201 is known as a function of the web content and will not be described.

In the variation example, the autocomplete detector 251 detects that the autocomplete has been executed by the function other than the IME 30 during the time when the user uses the IME 30 to enter a character in the address bar 201. For example, when a character displayed in the second predictive conversion candidate display field 122 provided by the IME 30 is selected or a character is entered using a method other than the character conversion function of the IME 30, the autocomplete detector 251 detects that the autocomplete has been executed by the function other than the IME 30 during the time when the user uses the IME 30 to enter a character in the address bar 201.

For example, when an entered character displayed in the first predictive conversion candidate display field 112 provided by the web content is selected during the time when the user uses the IME 30 to enter a character, the autocomplete detector 251 detects that the character has been autocompleted by the function other than the IME 30.

The autocomplete detector 251 may determine whether the user has used the IME 30 to enter a character, based on whether the position of a portion touched by the user on the touch display 15 is included in a region for which the IME 30 provides the function. For example, when touch entry is performed in a region corresponding to the first predictive conversion candidate display field 112 provided by the web content on the touch display 15 during the time when the user uses the IME 30 to enter a character, the autocomplete detector 251 detects that the character has been autocompleted by the web content.

Before a character is entered in the address bar 201 of the browser 20, the HTML content is not displayed. Thus, in this variation example, the autocomplete detector 251 does not acquire a character string from the DOM managing section 22. A character string entered in the address bar of the browser 20 (autocomplete detector 251) may be acquired by one or more of various known methods. For example, when the address bar is implemented as a text box, a character string included in the text box is acquired.

In this variation example, when a character entered in a component, which is the "input" region or the like and is included in the content, is not autocompleted by the content due to JavaScript, the content may be implemented in a function such as an autocomplete function.

Figure 10:
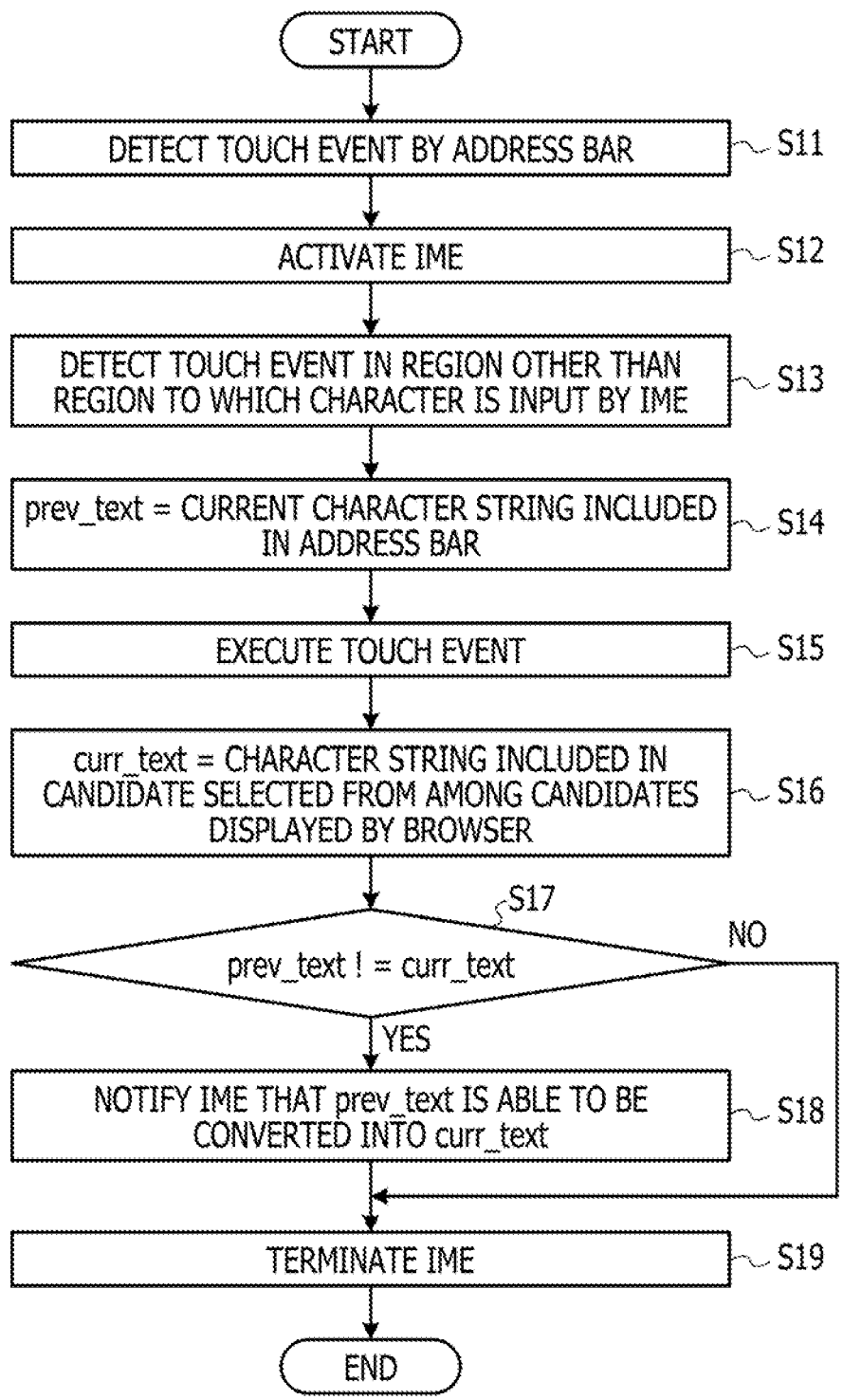
FIG. 10 is a flowchart describing details of a process by an autocomplete function of autocompleting a character in the computing device according to the variation example of the embodiment.
Figure 11:
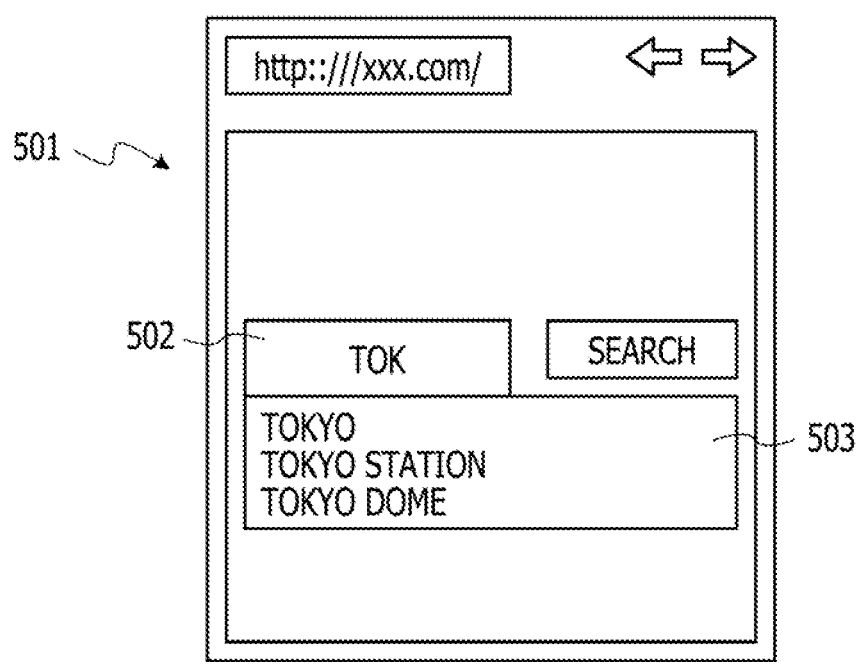
FIG. 11 is a diagram describing an autocomplete function provided by a web content in a related-art computing device.
Figure 12:
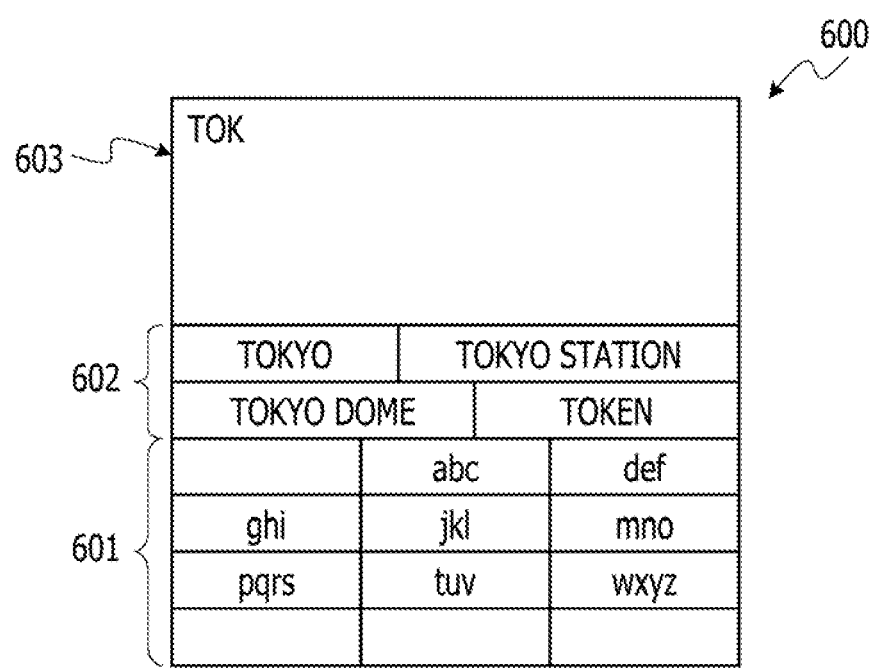
FIG. 12 is a diagram describing an autocomplete function provided by an IME in the related-art computing device.

Details of a process by the autocomplete function of autocompleting an entered character in the computing device 1 according to the variation example of the embodiment are described with reference to a flowchart (steps S11 to S19) illustrated in FIG. 10.

In the following process, the variable prev_text and the variable curr_text are used. Character strings are set in the variables.

In step S11, the user interface 25 (autocomplete detector 251) of the browser 20 detects a touch (touch event) by the user at a position corresponding to the address bar 201 on the touch display 15. For example, the address bar 201 of the browser 20 detects the touch event.

In step S12, the IME 30 is activated. The user uses the software keyboard 121 to start entering a character. For example, the user enters the character string "TOK".

When the character is entered in the address bar 201, the browser 20 displays, based on the character entered in the address bar 201, one or more entry candidates provided by the web content in the first predictive conversion candidate display field 112. For example, the browser 20 displays the character strings indicating "Tokyo", "Tokyo station" and "Tokyo dome" as entry candidates in the first predictive conversion candidate display field 112.

In addition, the IME 30 predicts, based on the character entered using the software keyboard 121, one or more character strings to be entered by the user and displays the one or more character strings as one or more entry candidates in the second predictive conversion candidate display field 122. For example, the IME 30 displays the character strings indicating "Tokyo", "Tokyo station", "Tokyo dome" and "Token", as entry candidates in the second predictive conversion candidate display field 122.

In step S13, the autocomplete detector 251 detects that the user has touched a region (or the autocomplete detector 251 detects a touch event), which is within the entry screen 100 and is not a region to which a character is input by the IME 30.

For example, the user uses his or her finger to touch the position of a single entry candidate displayed in the first predictive conversion candidate display field 112 on the touch display 15 to select the single entry candidate from among multiple entry candidates displayed in the first predictive conversion candidate display field 112. Then, the autocomplete detector 251 detects the touch.

In step S14, the autocomplete detector 251 sets, in prev_text, a character string displayed in the address bar 201 or a current character string (for example, the character string "TOK") included in the address bar 201.

In step S15, a process based on the touch event detected in step S13 is executed (the execution of the touch event). For example, the browser 20 displays, in the entry field 111, a character string, which is the entry candidate displayed in the first predictive conversion candidate display field 112 and touched by the user, and the browser 20 treats the displayed character string as an entered character string. In steps S13 to S15, the entry candidate is selected by the user from among the entry candidates displayed in the first predictive conversion candidate display field 112 and is entered.

In step S16, the autocomplete detector 251 sets, in curr_text, the character string touched and selected by the user from among the character strings displayed in the first predictive conversion candidate display field 112 or the current character string (for example, the kanji character string indicating "Tokyo station").

In step S17, the autocomplete detector 251 compares a value of prev_text with a value of curr_text. When the value of prev_text and the value of curr_text do not match as a result of the comparison (YES in step S17), a process of the flowchart illustrated in FIG. 10 proceeds to step S18.

It may be considered that the difference between the value of prev_text and the value of curr_text indicates that the touch entry has been performed in step S15 to select the entry candidate displayed in the first predictive conversion candidate display field 112. For example, the value of prev_text is converted into the value of curr_text.

In step S18, the predictive conversion result notifier 252 notifies the IME 30 of autocomplete result information indicating the value of prev_text as the entered character string and the value of curr_text as the result of autocompleting the entered character string. For example, the predictive conversion result notifier 252 notifies the IME 30 that the value of prev_text is able to be converted into the value of curr_text.

In step S19, the browser 20 issues a termination request to the IME 30. Then, the IME 30 is terminated and the character entry process is terminated.

When the value of prev_text and the value of curr_text match as a result of the comparison (NO in step S17), the process proceeds to step S19.

In the computing device 1 according to the variation example, even when a character is entered in a region that is the address bar of the browser 20 or the like and is managed by the DOM managing section 22, an effect that is the same as or similar to that obtained in the aforementioned embodiment may be obtained.

For example, the autocomplete detector 251 detects that the user has entered a character string in the entry screen 100 using the autocomplete function provided by the web server 3 or the like other than the IME 30 during the time when the user uses the IME 30 to enter a character.

Then, the predictive conversion result notifier 252 notifies the IME 30 of a result of autocompleting the character string by the autocomplete function provided by the function other than the IME 30 as autocomplete result information.

In the IME 30, the predictive conversion learning section 31 causes the predictive conversion dictionary 32 to learn, as a character string to be converted and a registered character string, the entered character string and the autocomplete result that are included in the autocomplete result information notified by the predictive conversion result notifier 252.

For example, when an entered character string is autocompleted using the function other than the IME 30 during character entry using the IME 30, the autocomplete detector 251 determines that the entered character string (character string to be converted) is able to be converted into a character string (autocomplete result) to which the entered character string has been autocompleted. Then, the predictive conversion result notifier 252 feeds the autocomplete result information back to the IME 30. This may improve the accuracy of the predictive conversion by the IME 30.

The embodiment and the variation example describe the case where the autocomplete function provided by the web content is used as the external autocomplete function upon character entry using the IME 30. The embodiment and the variation example, however, are not limited to this. Even in the case where a character is entered using the autocomplete function provided by the function other than the web content, the autocomplete detector 251 may use one or more of known various methods to detect that the character has been autocompleted by the function other than the IME 30. The predictive conversion result notifier 252 notifies autocomplete result information indicating the result of the autocomplete to the IME 30. The character entry assistant software is not limited to the IME and may be variously changed and used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computing device comprising:
a memory; and
a processor coupled to the memory and the processor configured to:
in response to receiving character information input from an input method editor (IME), display the character information in a first field on a web browser and display first candidate character information in a second field on the web browser, the first candidate character information indicating one or more character strings predicted based on the character information, the one or more character strings indicated in the first candidate character information being provided by an input assistant module performed on the web browser, the first field being a text input field provided by a web content displayed on the web browser, the second field being a field displayed by the web browser and different from a third field displayed by the IME, the third field being configured to display second candidate character information provided by the IME, the second candidate character information indicating one or more character strings provided by the IME;
perform, in response to receiving selection of a first character string from among the one or more character strings indicated by the first candidate character information displayed on the second field, transmission of the selected first character string in association with the character information to the IME to cause the IME to incorporate a pair of the selected first character string and the character information into a predictive conversion dictionary of the IME; and in response to receiving selection of a second character string from among the one or more character strings indicated by the second candidate character information displayed on the third field, display the selected second character string provided from the IME on the first field.

2. The computing device according to claim 1, wherein the processor is further configured to display, in response to acquiring content information from a web server, an image based on the acquired content information, and the display of the character information includes displaying the character information in a specific region included in the displayed image.

3. The computing device according to claim 1, wherein the transmission is executed in response to the detection of changing the displayed character information by the selection of the first character string.

4. The computing device according to claim 1, wherein the candidate character information is generated by software other than the character input assistant software.

5. The computing device according to claim 4, wherein the software is a web browser.

6. The computing device according to claim 4, wherein the processor is further configured to display other candidate character information indicating other one or more character strings predicted, based on the character information, by the character input assistant software in a region other than a region in which the candidate character information is displayed.

7. A computer-implemented predictive conversion method comprising:

displaying, in response to receiving character information input from an input method editor (IME), the character information in a first field on a web browser and display first candidate character information in a second field on the web browser, the first candidate character information indicating one or more character strings predicted based on the character information, the one or more character strings indicated in the first candidate character information being provided by an input assistant module performed on the web browser, the first field being a text input field provided by a web content displayed on the web browser, the second field being a field displayed by the web browser and different from a third field displayed by the IME, the third field being configured to display second candidate character information provided by the IME, the second candidate character information indicating one or more character strings provided by the IME;

transmitting, in response to receiving selection of a first character string from among the one or more character strings indicated by the first candidate character information displayed on the second field, the selected first character string in association with the character information to the IME to cause the IME to incorporate a pair of the selected first character string and the character information into a predictive conversion dictionary of the IME; and in response to receiving selection of a second character string from among the one or more character strings indicated by the second candidate character information displayed on the third field, displaying the selected second character string provided from the IME on the first field.

8. The predictive conversion method according to claim 7, further comprising:

displaying, in response to acquiring content information from a web server, an image based on the acquired content information, wherein the displaying of the character information includes displaying the character information in a specific region included in the displayed image.

9. The predictive conversion method according to claim 7, wherein the transmitting is executed in response to the detection of changing the displayed character information by the selection of the first character string.

10. The predictive conversion method according to claim 7, wherein the candidate character information is generated by software other than the character input assistant software.

11. The predictive conversion method according to claim 10, wherein the software is a web browser.

12. The predictive conversion method according to claim 10, further comprising:

displaying other candidate character information indicating other one or more character strings predicted, based on the character information, by the character input assistant software in a region other than a region in which the candidate character information is displayed.

13. A non-transitory computer-readable medium storing instructions executable by one or more computers, the instructions comprising:

in response to receiving character information input from an input method editor (IME), displaying the character information in a first field on a web browser and displaying first candidate character information in a second field on the web browser, the first candidate character information indicating one or more character strings predicted based on the character information, the one or more character strings indicated in the first candidate character information being provided by an input assistant module performed on the web browser, the first field being a text input field provided by a web content displayed on the web browser, the second field being a field displayed by the web browser and different from a third field displayed by the IME, the third field being configured to display second candidate character information provided by the IME, the second candidate character information indicating one or more character strings provided by the IME;

transmitting, in response to receiving selection of a first character string from among the one or more character strings indicated by the first candidate character information displayed on the second field, the selected first character string in association with the character information to the IME to cause the IME to incorporate a pair of the selected first character string and the character information into a predictive conversion dictionary of the IME; and in response to receiving selection of a second character string from among the one or more character strings indicated by the second candidate character information displayed on the third field, displaying the selected second character string provided from the IME on the first field.

* * * * *